United States Patent [19]

Nagano

[11] Patent Number: 4,654,723
[45] Date of Patent: Mar. 31, 1987

[54] CCD SENSOR OUTPUT CIRCUIT OF IMAGE READING APPARATUS

[75] Inventor: Fumikazu Nagano, Yamatokoriyama, Japan

[73] Assignee: Sharp Kabushiki Kaisha, Osaka, Japan

[21] Appl. No.: 721,929

[22] Filed: Apr. 11, 1985

[30] Foreign Application Priority Data

Apr. 11, 1984 [JP] Japan .................. 59-73562

[51] Int. Cl.$^4$ ............................. H04N 1/010
[52] U.S. Cl. .................... 358/293; 358/282; 358/280; 250/214
[58] Field of Search ............... 358/293, 294, 213, 282; 250/214 R, 206, 214 D, 214 AG, 214 AL, 214 C; 280/214 DC

[56] References Cited

U.S. PATENT DOCUMENTS 4,408,231 10/1983 Bushaw et al. ............ 358/282

OTHER PUBLICATIONS

A. J. Dattilo et al. "Variable Intensity Illumination Scanner Calibration System" IBM Technical Discl. Bul., vol. 21, No. 9, 2-79, p. 3546.
L. W. Bassetti et al. "Illumination Regulation For Array Scanner" IBM Technical Discl. Bul., vol. 22, No. 8A, Jan. 1980, p. 3131.

Primary Examiner—Edward L. Coles, Sr.
Attorney, Agent, or Firm—Birch, Stewart, Kolasch & Birch

[57] ABSTRACT

A CCD sensor output circuit of an image reading apparatus adapted to output a stable reading signal from a CCD sensor even if the light source changes in temperature due to heating. One portion of a region read by the CCD sensor serves as a reference region. In accordance with the output of the CCD sensor corresponding to the reference region, after the light source has been turned on in response to a lighting control signal, the reflected lights from the images are accumulated in the CCD sensor at a first timing after the light source has been made stable, and the output of the CCD sensor is transferred at a second timing after the firt timing but before the output of the next lighting control signal, thus providing the CCD sensor output after the light source has been made stable.

5 Claims, 6 Drawing Figures

CCD SENSOR OUTPUT CIRCUIT OF IMAGE READING APPARATUS

BACKGROUND OF THE INVENTION

1. Field of the Invention

The present invention relates to a CCD sensor output circuit of an image reading apparatus and more particularly, to improvements in a CCD sensor output circuit in an image reading apparatus, which detects, by a CCD sensor, the lights coming from a light source which are reflected by images in order to read the images.

2. Description of the Prior Art

FIG. 1 shows a conventional optical system in an image reading apparatus, to which one embodiment of the present invention applies. Referring to FIG. 1, lights from a white colored fluorescent lamp 3 are applied upon a color manuscript 2 with the color manuscript 2 arranged before a white-colored back plate 1. The lights from the white-colored fluorescent lamp 3, reflected by the color manuscript 2, are reflected by a mirror 4, focused, and input to a CCD sensor 6.

An image reading apparatus using a CCD sensor 6 as shown in FIG. 1 may be used in a facsimile OCR, a color scanner or the like. In such an image reading apparatus, the white-colored fluorescent lamp 3 is disadvantageous in that the radiation level changes due to differences in ambient temperatures or through rises in the guide temperature which is raised by self-heating after large amounts of lighting. As a measure to prevent these problems, methods have been adopted which use an automatic gain control circuit (AGC circuit) or flash a white-colored fluorescent lamp to change its lighting width thereby controlling the radiation amount. However, disadvantageously, a proper circuit is not provided which precisely controls a high-speed analog signal such as an AGC circuit. A method which varies the lighting width of the white-colored fluorescent lamp 3 becomes unstable in lighting when the lighting duty cycle becomes extremely small.

SUMMARY OF THE INVENTION

Accordingly, an essential object of the present invention is to provide a CCD sensor output circuit of an image reading apparatus which may output a stable reading signal from a CCD sensor even if the light source changes in temperature due to heating.

In accomplishing the object of the present invention, according to one preferred embodiment of the present invention, there is provided a CCD sensor output circuit which adjusts to the changes in the output level of the CCD sensor, due to the changes in the temperature of the light source, in accordance with the CCD sensor output of a reference region to be read by the CCD sensor used in an image reading apparatus for reading the images through detection. The CCD sensor detects the light from a light source reflected by the images. The CCD sensor output circuit includes an output adjusting means which decides how the light source has been made stable, in accordance with an output signal corresponding to said reference region among the output signals of said CCD sensor, to adjust the reading output of the CCD sensor. A lighting control means is provided for lighting the light source only for a time period within a predetermined period. A timing signal output means is provided for outputting timing signals at a first time period lasting until after the output adjusting means has reached the stable condition of the light source after the lighting of the light source and beginning in synchronous relation with the light control signal from the lighting control means, and for outputting a second timing signal at a given second time period beginning after detection of the stable condition but before the outputting of the next lighting control signal, A transfer control means is provided which causes the CCD sensor to read the reflected lights from the images after the first timing signal lasting the first time period is output from the timing signal output means, then transfers the outputs of the CCD sensor at the second time period. With this construction, the reflected lights from the images are read by the CCD sensor after the first time period after the light source has become stable, in accordance with the output of the CCD sensor corresponding to a reference region, when the light source has been lighted according to a lighting control signal, with one portion of a region, to be read by the CCD sensor, as a reference region. The CCD sensor output after the light source has been stabilized is provided by transferring the CCD sensor output at a given second time period before the output of the next lighting control signal from but after the first time period.

BRIEF DESCRIPTION OF THE DRAWINGS

This and other objects and features of the present invention will become apparent from the following description taken in conjunction with the preferred embodiment thereof with reference to the accompanying drawings, in which.

DETAILED DESCRIPTION OF THE EMBODIMENTS

Figure 1:
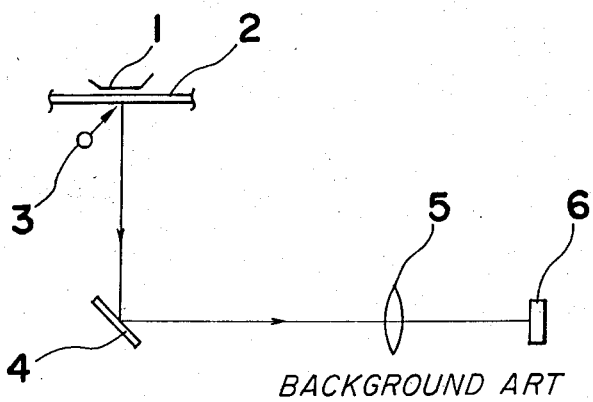
FIG. 1 is a view showing an optical system in an image reading apparatus, already referred to above.
Figure 2:
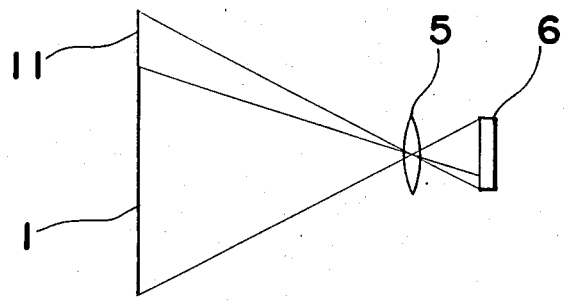
FIG. 2 is a view showing a principle for controlling the CCD output, in one embodiment of the present invention, within a constant range.
Figure 3:
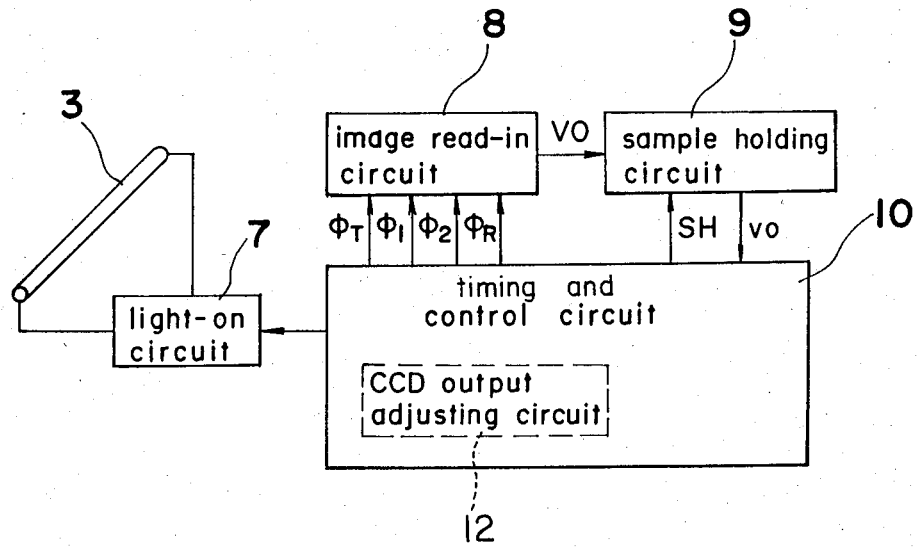
FIG. 3 is a schematic block diagram of an optical according to one embodiment of the present invention.

Referring to FIG. 2, a reference region 11 in front of which the color manuscript 2 does not pass is provided in the white-colored back plate 1. The reference region 11 is provided as a reference for adjusting the output of the CCD sensor 6 shown in FIG. 1. The lights from the white-colored fluorescent lamp 3 which are reflected by the reference region 11 are input into the CCD sensor 6 through a lens 5. The level of a signal corresponding to the reference region 11, from among the output signals of the CCD sensor 6, is detected by the CCD output adjusting circuit 12 shown in FIG. 3 so that the level can be controlled within a constant range. Referring to FIG. 3, the white-colored lamp 3 is turned on by a lighting circuit 7 in accordance with a lighting control signal from a control circuit 10. As described hereinabove, the control circuit 10 is adapted to control the level of the CCD output within a constant range in accordance with the output signal of the CCD sensor 6 corresponding to the reference region 11. Also, the control circuit 10 feeds a transfer pulse $\phi_T$, clock pulses $\phi_1, \phi_2$ and a reset pulse $\phi_R$ to the image read-in portion 8. The image read-in portion 8 reads the images in accordance with the reflected lights from the color manuscript 2. An image signal VO, which is read out, is fed to a sample hold circuit 9. A sampling pulse SH is fed from the control circuit 10 to the sample hold circuit 9. The sample hold circuit 9 holds in sample the reading signal VO from the image read-in portion 8 in accordance with the sampling pulse SH. The output signal VO which is sample-held is fed to the control circuit 10.

Figure 4:
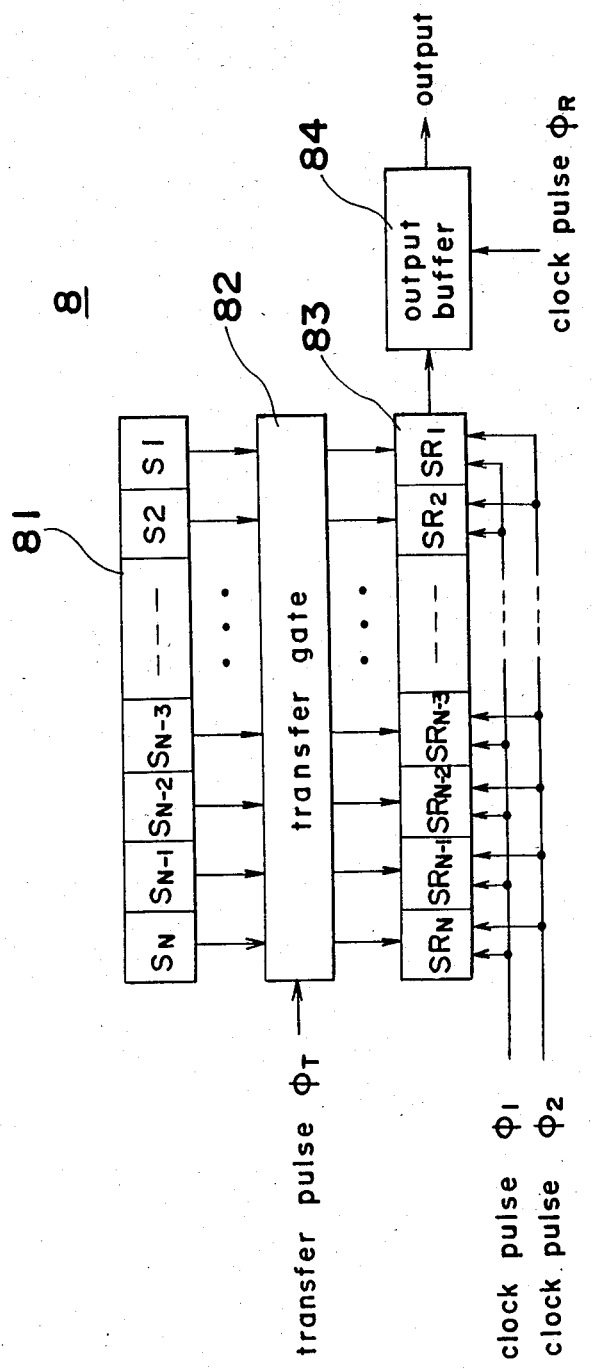
FIG. 4 is a detailed block diagram of the image read-in portion shown in FIG. 3.

The detailed construction of the image read-in portion 8 shown in FIG. 3 will be described hereinafter with reference to FIG. 4. A CCD sensor 81 outputs light electric-charges in accordance with the reflected lights from the images. The light electric-charges are fed to a transfer gate 82. A transfer pulse $\phi_T$ is fed to the transfer gate 82 and the light electric-charges from the CCD sensor 81 are transferred to an analog shift register 83 in accordance with the transfer pulse $\phi_T$. The clock pulses $\phi_1$, $\phi_2$ are fed to the analog shift register 83. The analog shift register 83 sequentially outputs the light electric-charges of the CCD sensor 81, transferred from the transfer gate 82, in accordance with the clock pulses $\phi_1$, $\phi_2$ to feed them to an output buffer 84. The output buffer 84 sequentially outputs the image data shifted from the analog shift register 83 in accordance with the reset pulse $\phi_R$.

Figure 5:
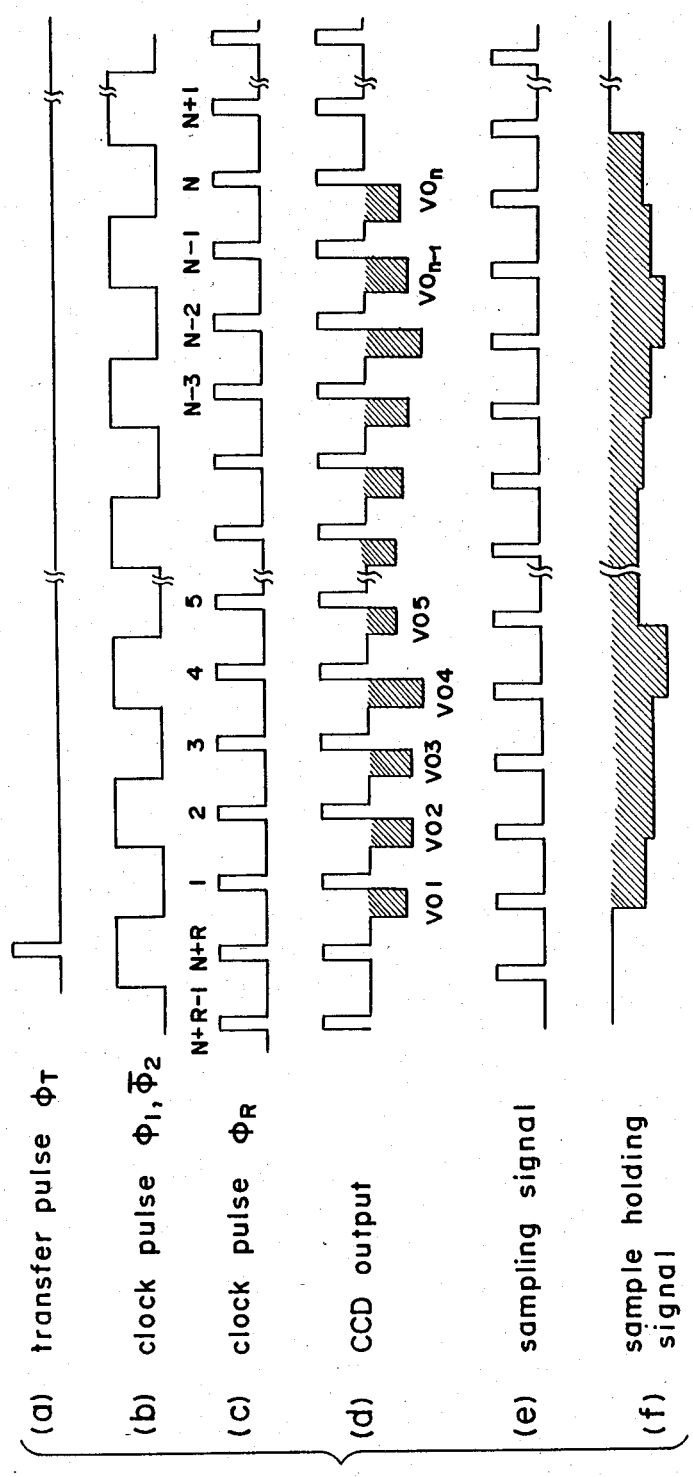
FIG. 5 and FIG. 6 are wave-form views of each portion of FIG. 3 and FIG. 4.
Figure 6:
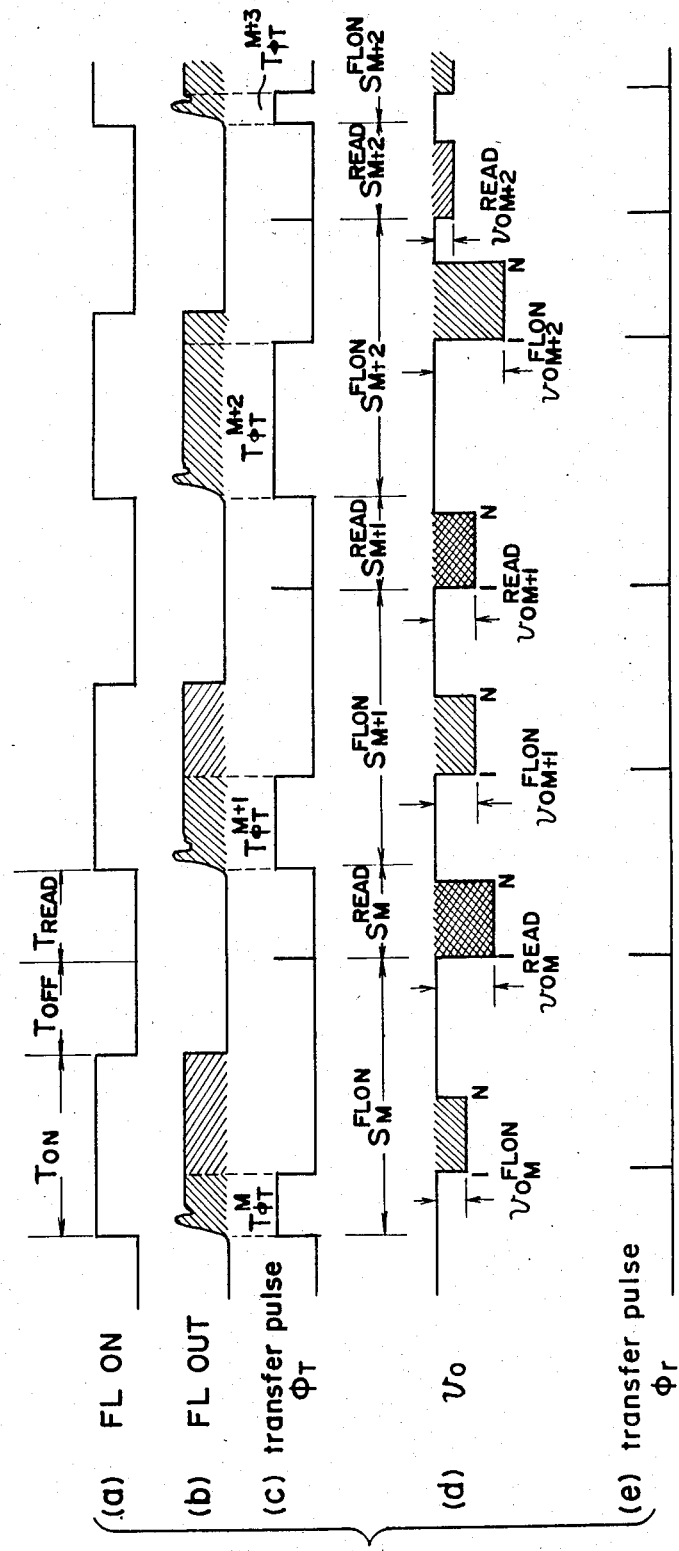

The operation of an image reading apparatus shown in FIG. 3 and FIG. 4 will be described hereinafter with reference to FIG. 5 and FIG. 6, showing the wave form views of each portion of FIG. 3 and FIG. 4. A flashing circuit 7 flashed a white-colored fluorescent lamp 3 in accordance with a lighting control signal FL to be given from the control circuit 10. The lights from the white-colored fluorescent lamp 3 are applied upon the color manuscript 2 and the reference region 11 of the white-colored back plate 1. The reflected lights from the images and the reflected lights from the reference region 11 from the white-colored fluorescent lamp 3 are detected by the CCD sensor 81. Namely, the light electric-charges corresponding to the reflected lights from the images are accumulated upon, for example, regions $S_1$ through $S_{N-3}$, among the respective regions $S_1$, $S_2$, $S_3$ ... $S_{N-1}$, $S_N$ shown in FIG. 4, on the CCD sensor 81, with the light electric-charges corresponding to the reflected lights from the reference region 11 accordingly being accumulated upon the regions $S_{N-2}$ through $S_N$. When the transfer pulse $\phi_T$ is fed to the transfer gate 82, the light electric-charges accumulated on the respective regions $S_1$, $S_2$, $S_3$ ... $S_{N-1}$, $S_N$ of the CCD sensor 81 are loaded into the regions $SR_1$, $SR_2$, $SR_3$, ... $SR_{N-1}$, $SR_N$ of the analog shift register 83.

The analog shift register 83 transfers the loaded contents to an output buffer 84 in accordance with the clock pulses $\phi_1$, $\phi_2$. The output buffer 84 photoelectrically converts the light electric-charges transferred from the analog shift register 83 to output them as CCD output signal VO.

It is to be noted that light electric charges which are sequentially transferred from the analog shift register 83 are reset each time within the output buffer 84 by a reset pulse $\phi_R$. Accordingly, the CCD sensor output signals $VO_1$, $VO_2$, $VO_3$, ... $VO_N$ corresponding to the light electric-charges accumulated on the respective regions $S_1$, $S_2$, $S_3$, ... $S_{N-1}$, $S_N$ are output from the CCD sensor 81. They are the normal CCD output signals.

The characteristic portions of the present invention will be described hereinafter with reference to FIG. 6. In one embodiment of the present invention, one scanning period from the initial lighting of the white-colored fluorescent lamp 3 to the next lighting thereof is divided among a $T_{on}$ period, a $T_{off}$ period, and a $T_{read}$ period as shown in FIG. 6(a), and one unit of the scanning period is composed of a scanning period $S^{flon}$ in which the white-colored fluorescent lamp 3 radiates, and a scanning period $S^{read}$ for output of the CCD sensor 81. Also, assume that the scanning of the CCD sensor 81 is composed of M, M+1, M+2, M+3. And at the radiation timing of each scanning, the white-colored lamp 3 normally lights only during the same time $T_{OM}$.

In the period $S_M^{FLON}$ of the radiation timing in the scanning period M, the transfer pulse $\phi_T$ is the interval "H" of the time $T\phi_T$. Accordingly, the light electric-charges in the CCD sensor 81, caused by the radiation (oblique line portions shown in FIG. 6(b)), in that interval, are transferred to the analog shift register 83 simultaneously with the production of the light electric-charges. Namely, the light electric-charges are transferred to the analog shift register 83 simultaneously with their production, because the analog shift register 83 is lower in electric potential to electrons than the CCD sensor 81 when the transfer pulse $\phi_T$ is "H". When the transfer pulse $\phi_T$ changes from "H" to "L", the light electric-charges caused by the subsequent radiation level of white-colored fluorescent lamp 3 are accumulated on the CCD sensor 81. Also, simultaneously with the change from "H" to "L" of the transfer pulse $\phi_T$, clock pulses $\phi_1$, $\phi_2$ are fed to the analog shift register 83 and the output $VO_M$ of the CCD sensor 81 corresponding to the light electric-charges produced during the transfer pulse $T\phi_T$ are sequentially outputted.

A transfer pulse $\phi_T$ of comparatively short width is given to the transfer gate 82 after the further lapse of the $T_{off}$ time after the radiation time $T_{on}$ of the white-colored fluorescent lamp 3 has passed. And the transfer gate 82 transfers to the analog shift register 83 the light electric-charges accumulated on the CCD sensor 81 during the time period $(T_{on} - T\phi_T)$ after the white fluorescent lamp 3 turns off, after the lapse of the $T\phi_T$ of the transfer pulse $\phi_T$. Also, the light electric-charges transferred to the analog shift register 83 are sequentially shifted by the clock pulses $\phi_1$, $\phi_2$ and sequentially outputted as the output $VO_M^{READ}$ of the CCD sensor 81.

A $T_{READ}$ period, after a pulse of comparatively short width among the transfer pulses $\phi_T$, is assumed to be a scanning period $S_M^{READ}$. Accordingly, in FIG. 6, assume that no drifts in temperature are provided in the radiation output of the white-colored fluorescent lamp 3, and the output of the CCD sensor 81, $VO^{FLON} + VO^{READ}$ becomes constant. It is apparent from the above-description that the amount of the output $VO^{READ}$ of the CCD sensor 81 to be produced during the $T_{READ}$ period using the output of the CCD sensor 81 can be controlled in accordance with the width of the transfer pulse $\phi_T$.

The reason why the $T_{OFF}$ period has been determined will be described. As the $T\phi_T$ of the transfer pulse $\phi_T$ comes closer to the $T_{on}$ period, the output $VO_M^{FLON}$ of the CCD sensor 81 in the radiation timing $S_M^{FLON}$ is output to the period $T_{off}$. Although the precise radiation spectrum has to be used generally when the white-colored fluorescent lamp 3 is used as a light source for reading the color manuscript, the radiation spectrum immediately after the white-colored fluorescent lamp 3 has been turned on and the radiation spectrum after the stable lighting has been provided are somewhat different from each other as shown in FIG. 6(b). Namely, time taken from the output of the lighting signal FLON shown in FIG. 6(a) to the actual lighting of the white-colored fluorescent lamp 3 is dispersed each time, and the time taken before the stable lighting has been provided is also dispersed. The minimum width of the transfer pulse $\phi_T$ at the radiation timing is restricted to the time $T_{MIN}$ (see the scanning period M+3 in FIG. 6) taken for the white-colored fluorescent lamp 3 to reach its stable lighting. In this way the output $VO^{READ}$ of the CCD sensor 81 that appears at the timing for output of the CCD sensor 81 caused by the radiation will be provided after the white-colored fluorescent lamp 3 has reached its stable lighting. Thus, the control circuit 10 shown in FIG. 3 determines the falling timing of the transfer pulse $\phi_T$, in accordance with the read-in signal corresponding to the regions $S_{N-2}$ through $S_N$ of the CCD sensor 81 corresponding to the reference region 11, so that the CCD output adjusting circuit 12 may vary the width of the transfer pulse $\phi_T$ from a time $T_{MIN}$ or more to control the CCD output within a constant range. Namely, the control circuit 10 lengthens the "H" period $T\phi_T$ of the transfer pulse $\phi_T$ in the next scanning period if the output signal level of the CCD sensor 81 corresponding to the reference region 11 of the white-colored back plate 1 is higher than a certain reference level, and makes the "H" period $T\phi_T$ of the transfer pulse $O_T$ shorter if the output signal level is lower than a certain reference level, so as to control the level of the output $VO^{READ}$, which appears, at the scanning period $S_M$ of the timing, using the output of the CCD sensor 81, to within a certain range.

In the above description, the transfer pulse $\phi$ was becomes "H" only during the $T\phi_T$ period of the radiation timing as shown in FIG. 6(b), but it is not restricted to the above description. The pulse signal of comparative short width may be constructed to be output when the white-colored fluorescent lamp 3 has reached its stable condition. The pulse signal is output for a period after the white-colored fluorescent lamp 3 becomes stable as shown in FIG. 6(e).

Also, in the embodiment of the present invention, explanation has been given about adjustment of the output level degree of the CCD sensor through changes in the temperature of the light source by the white-colored fluorescent lamp 3. Explanation may be given about each ray of light of three primary colors of the color image reading apparatus.

Thus, in accordance with the present invention, it is so arranged that one portion of a region to be read by a CCD sensor is made to serve as a reference region, in accordance with the output of the CCD sensor corresponding to the reference region, when the light source has been turned on according to a lighting control signal. The reflected lights from the images are read by the CCD sensor at a first timing after the light source has been made stable, and the output of the CCD sensor is transferred at a given second timing from the first timing to the output of the next lighting control signal, thus providing CCD sensor output after the light source has been made stable.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In an image reading apparatus having a CCD sensor for detecting light from a light source which are reflected by images, a CCD sensor output circuit which adjusts to changes in an output level of said CCD sensor, due to changes in a temperature of said light source, in accordance with the CCD sensor output of a reference region read by said CCD sensor, the improvement comprising:
   output adjusting means for detecting when said light source has been stabilized and adjusting the output level of said CCD sensor, in accordance with an output signal from said CCD sensor corresponding to said reference region,
   lighting control means for lighting said light source for a time period less than the length of a predetermined scanning time period in response to a lighting control signal,
   timing signal output means for outputting first timing signals for a first time period from the lighting of said light source until after said output adjusting means has detected that said light source has been stabilized, and second timing signals for a second time period beginning after said light source has been stabilized but prior to the output of the next said lighting control signal, and
   transfer control means, responsive to said timing signal output means, for transferring the output of said CCD sensor, which was accumulated in said CCD sensor after said first time period at said second time period,
   said output adjusting means adjusting said first time period for the output of said first timing signals or the width of said first timing signals so that the output level of said CCD sensor transferred at said second time period will be controlled to a given level.

2. An apparatus, as recited in claim 1, further comprising sample holding means for supplying said output signal from said CCD sensor corresponding to said reference region to said output adjusting means.

3. An appartus, as recited in claim 1, wherein said first time period or the width of said first timing signals is not shortened beyond a minimum time period or width.

4. An apparatus, as recited in claim 1, wherein said reference region is provided in one portion of a region to be read by said CCD sensor,
   said output adjusting means adjusting said first time period for output of said first timing signals or the width of said first timing signals in accordance with the CCD sensor output read out for said reference region.

5. An apparatus, as recited in claim 4, wherein said output adjusting means adjusts said first time period in accordance with the CCD sensor output read out for said reference region in an immediately preceding scanning period.

* * * * *